United States Patent
Yoshida (10) Patent No.: US 11,442,322 B2
(45) Date of Patent: Sep. 13, 2022

(54) LIGHT CONTROL SHEET AND LIGHT CONTROL WINDOW

(71) Applicant: TOPPAN PRINTING CO., LTD., Taito-ku (JP)

(72) Inventor: Tetsushi Yoshida, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 0 days.

(21) Appl. No.: 16/877,644

(22) Filed: May 19, 2020

(65) Prior Publication Data
US 2020/0278566 A1    Sep. 3, 2020

Related U.S. Application Data

(63) Continuation of application No. PCT/JP2018/048497, filed on Dec. 28, 2018.

(30) Foreign Application Priority Data
Dec. 28, 2017    (JP) .............................. JP2017-254088

(51) Int. Cl.
*G02F 1/1334* (2006.01)
*G02F 1/137* (2006.01)
(Continued)

(52) U.S. Cl.
CPC .............. *G02F 1/137* (2013.01); *B60J 1/001* (2013.01); *B60J 3/04* (2013.01); *B60J 3/06* (2013.01);
(Continued)

(58) Field of Classification Search
None
See application file for complete search history.

(56) References Cited

U.S. PATENT DOCUMENTS 5,206,747 A * 4/1993 Wiley .................. G02F 1/1334
349/113
6,181,393 B1 * 1/2001 Enomoto .......... G02F 1/133377
349/79
(Continued)

FOREIGN PATENT DOCUMENTS

EP    0 488 116 A2    6/1992
JP    H08-240796 A    9/1996
(Continued)

OTHER PUBLICATIONS

International Search Report dated Mar. 19, 2019 in PCT/JP2018/048497, filed Dec. 28, 2018 (with English Translation).
(Continued)

*Primary Examiner* — Thanh Nhan P Nguyen
(74) *Attorney, Agent, or Firm* — Oblon, McClelland, Maier & Neustadt, L.L.P.

(57) ABSTRACT

A light control sheet including a light control layer sandwiched between first and second orientation layers and including a polymer network in which domains are dispersed and filled with a liquid crystal composition including a liquid crystal molecule and a dichroic dye, a pair of transparent electrodes sandwiching the orientation layers, and a polarizing layer positioned on an opposite side of the first orientation layer to the light control layer. The light control layer has a transmittance that increases upon application of a driving voltage to the pair of transparent electrodes. When the driving voltage is not applied between the transparent electrodes, the orientation layers orient the liquid crystal molecule and the dichroic dye horizontally to the orientation layers and orient an orient absorption ax of the dichroic dye to cross an absorption axis of the polarizing layer as viewed in a thickness direction of the light control layer.

20 Claims, 6 Drawing Sheets

(51) Int. Cl.
- *B60J 1/00* (2006.01)
- *B60J 3/04* (2006.01)
- *B60J 3/06* (2006.01)
- *G02F 1/1335* (2006.01)
- *G02F 1/1337* (2006.01)
- *G02F 1/1343* (2006.01)
- *B60J 1/08* (2006.01)
- *B60J 1/18* (2006.01)

(52) U.S. Cl.
CPC .......... *G02F 1/1334* (2013.01); *G02F 1/1337* (2013.01); *G02F 1/13439* (2013.01); *G02F 1/133528* (2013.01); *B60J 1/08* (2013.01); *B60J 1/18* (2013.01); *G02F 1/13345* (2021.01); *G02F 2201/503* (2013.01); *G02F 2202/043* (2013.01)

(56) References Cited

U.S. PATENT DOCUMENTS

| | | | |
|---|---|---|---|
| 2009/0191361 A1* | 7/2009 | Hiji | C09K 19/544 428/1.1 |
| 2011/0157529 A1* | 6/2011 | ASsaoka | G02F 1/1334 349/113 |
| 2012/0088320 A1* | 4/2012 | Hwang | G02F 1/1334 438/27 |
| 2015/0062502 A1 | 3/2015 | Saneto et al. | |
| 2016/0026026 A1 | 1/2016 | Kim et al. | |
| 2019/0162991 A1* | 5/2019 | Hagiwara | G02F 1/13737 |

FOREIGN PATENT DOCUMENTS

| | | |
|---|---|---|
| JP | 2004-093873 A | 3/2004 |
| JP | 2006-162823 A | 6/2006 |
| JP | 2011-033798 A | 2/2011 |
| JP | 2017-181888 A | 10/2017 |
| JP | 2018-154705 A | 10/2018 |
| KR | 10-2016-0117344 A | 10/2016 |
| WO | WO 2013/175927 A1 | 11/2013 |
| WO | WO 2017/203809 A1 | 11/2017 |

OTHER PUBLICATIONS

Extended European Search Report dated Dec. 9, 2020 in European Patent Application No. 18894420.1, 8 pages.

European Communication dated Jan. 31, 2022 in European Patent Application No. 18894420.1. 4 pages.

* cited by examiner

LIGHT CONTROL SHEET AND LIGHT CONTROL WINDOW

CROSS-REFERENCE TO RELATED APPLICATIONS

The present application is a continuation of International Application No. PCT/JP2018/048497, filed Dec. 28, 2018, which is based upon and claims the benefits of priority to Japanese Application No. 2017-254088, filed Dec. 28, 2017. The entire contents of all of the above applications are incorporated herein by reference.

BACKGROUND OF THE INVENTION

Field of the Invention

The present invention relates to a light control sheet and a light control window provided with the light control sheet.

Discussion of the Background

There are known light control sheets that are provided with a light control layer containing a polymer network liquid crystal. Such light control sheets are provided with a pair of transparent films, a pair of transparent electrodes sandwiched between the pair of transparent films, and a light control layer positioned between the pair of transparent electrodes. The light control layer contains a polymer network having a three-dimensional mesh, and a liquid crystal composition positioned in a plurality of domains which are defined by the polymer network. In such a light control sheet, the light control layer has transmittance that is different between when a driving voltage is applied to the light control sheet and when no driving voltage is applied thereto (e.g., see JP 2006-162823 A).

SUMMARY OF THE INVENTION

According to an aspect of the present invention, a light control sheet includes a pair of orientation layers including a first orientation layer and a second orientation layer, a light control layer sandwiched between the first and second orientation layers and including a polymer network in which domains are dispersed and filled with a liquid crystal composition including a liquid crystal molecule and a dichroic dye, a pair of transparent electrodes sandwiching the pair of orientation layers, and a polarizing layer positioned on an opposite side of the first orientation layer to the light control layer. The light control layer has a transmittance that increases upon application of a driving voltage to the pair of transparent electrodes. When the driving voltage is not applied between the transparent electrodes, the pair of orientation layers orient the liquid crystal molecule and the dichroic dye horizontally to the pair of orientation layers and orient an orient absorption ax of the dichroic dye to cross an absorption axis of the polarizing layer as viewed in a thickness direction of the light control layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

Figure 1:
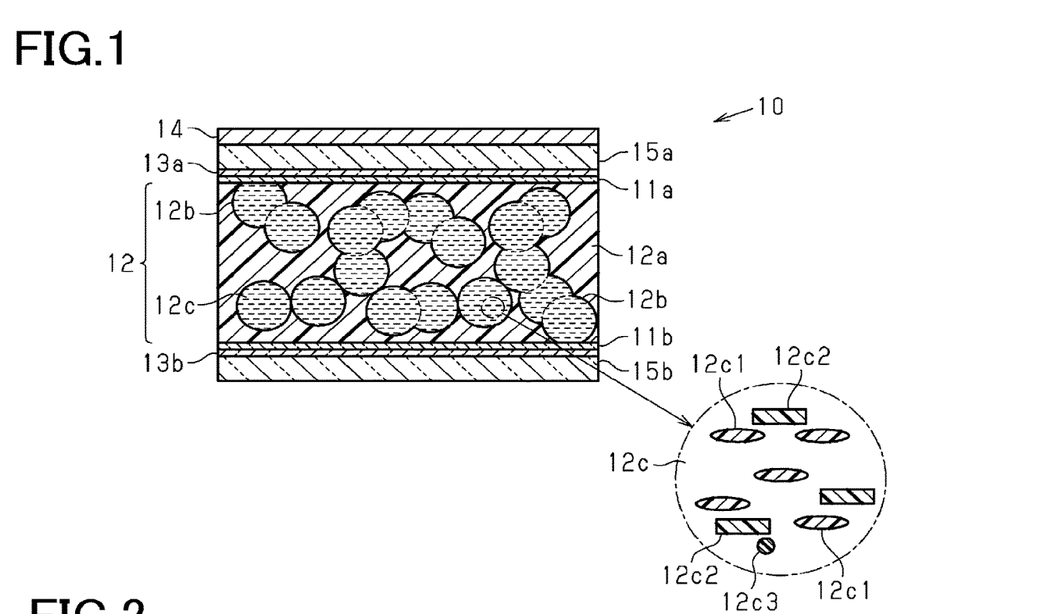
FIG. 1 is a cross-sectional view illustrating a structure of a light control sheet according to an embodiment.
Figure 2:
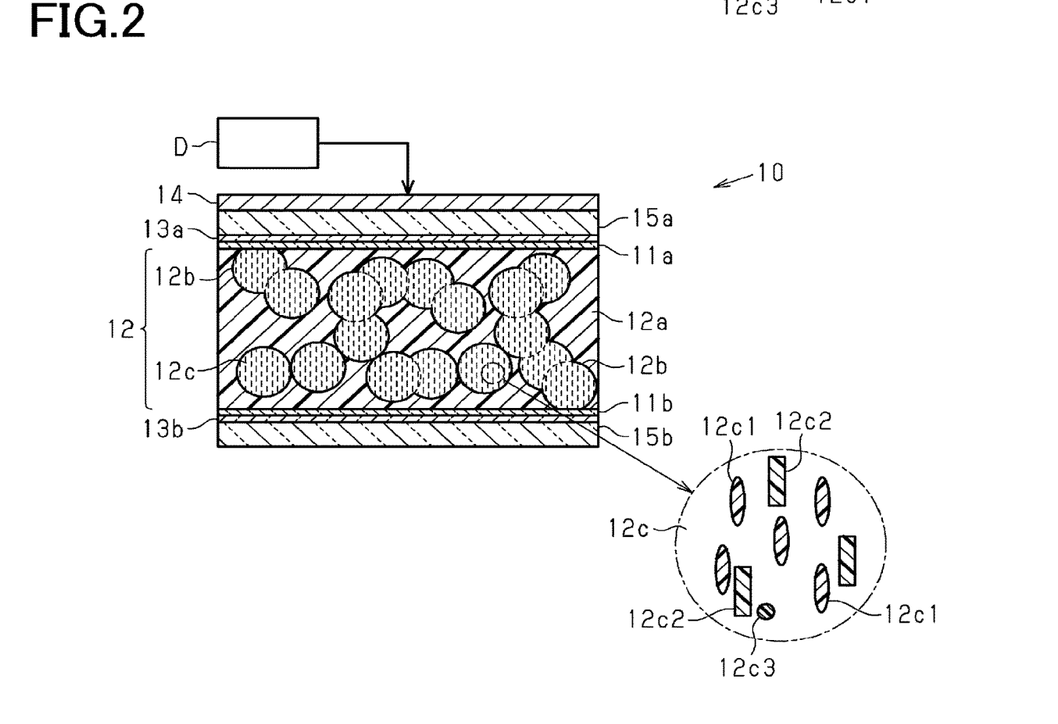
FIG. 2 is a cross-sectional view illustrating a structure of the light control sheet according to the embodiment.

An embodiment of a light control sheet and a light control window will be described with reference to FIGS. 1 to 12. FIG. 1 shows a state in which no driving voltage is applied between transparent electrodes provided to the light control sheet. FIG. 2 shows a state in which a driving voltage is applied between the transparent electrodes. In FIGS. 1 and 2, domains contained in a light control layer are exaggerated for ease of explaining the configuration of the light control layer. In the following description, the configuration and effects of the light control sheet, and the configuration of the light control window will be sequentially explained.

<Configuration of Light Control Sheet>

The configuration of the light control sheet will be described with reference to FIG. 1. In the present embodiment, the term "sheet" refers to a structure having a wide surface relative to the thickness, and includes the term "film". A light control sheet 10 is provided with a pair of orientation layers and a light control layer 12. The pair of orientation layers include a first orientation layer 11a and a second orientation layer 11b. The light control layer 12 is sandwiched between the first and second orientation layers 11a and 11b, and the first and second orientation layers 11a and 11b each contact the light control layer 12. The light control layer 12 contains a polymer network 12a and a plurality of domains 12b dispersed in the polymer network 12a. Each domain 12b is filled with a liquid crystal composition 12c that contains liquid crystal molecules 12c1 and dichroic dyes 12c2. Such a light control layer is generally referred to as a polymer network liquid crystal (PNLC).

The light control sheet 10 is further provided with a pair of transparent electrodes sandwiching the pair of orientation layers and a polarizing layer 14 positioned on the opposite side of the first orientation layer 11a to the light control layer 12. The pair of transparent electrodes includes a first transparent electrode 13a and a second transparent electrode 13b. A laminate formed from the first orientation layer 11a, the light control layer 12 and the second orientation layer 11b is sandwiched between the first transparent electrode 13a and the second transparent electrode 13b.

The transmittance of the light control layer 12 increases upon application of a driving voltage to the pair of transparent electrodes. In a state in which no driving voltage is applied between the first and second transparent electrodes 13a and 13b, the pair of orientation layers orient the liquid crystal molecules 12c1 and the dichroic dyes 12c2 horizontally to the pair of orientation layers and also such that absorption axes of the dichroic dyes 12c2 are perpendicular to an absorption axis of the polarizing layer 14 as viewed in the thickness direction of the light control layer 12. It should be noted that the orientation of the liquid crystal molecules 12c1 in a state in which no driving voltage is applied to the pair of transparent electrodes is the initial orientation.

The plurality of domains 12b include domains 12b contacting the first or second orientation layer 11a or 11b. Among the domains 12b, those which are adjacent to each other are connected to each other. In other words, the liquid crystal composition 12c in the domains 12b has been phase-separated from the polymer network 12a. Furthermore, the liquid crystal composition 12c in each domain 12b is continuous with the liquid crystal composition 12c in other domains 12b.

Therefore, the liquid crystal molecules 12c1 and dichroic dyes 12c2 positioned in each domain 12b change their orientation in conjunction with the liquid crystal molecules 12c1 and dichroic dyes 12c2 contained in other domains 12b upon application of a driving voltage to the light control layer 12. The size of one domain 12b of interest, among the domains 12b, is estimated from a phantom circle through analysis of an image obtained by imaging the polymer network 12a.

The light control sheet 10 is further provided with a pair of transparent substrates. Of the pair of transparent substrates, the transparent substrate positioned between the first transparent electrode 13a and the polarizing layer 14 is the first transparent substrate 15a, and the transparent substrate positioned on the opposite side of the second transparent electrode 13b to the second orientation layer 11b is the second transparent substrate 15b. The individual layers of the light control sheet 10 will be more specifically explained below.

<Transparent Substrate>

The first and second transparent substrates 15a and 15b have optical transparency and transmit visible light. Resin films or glass substrates may be used for the first and second transparent substrates 15a and 15b. For example, the material that can be used for forming the resin films may be polycarbonate (PC), polyvinyl chloride (PVC), polyvinyl alcohol (PVA), polyethylene terephthalate (PET), or the like.

<Transparent Electrode>

The first and second transparent electrodes 13a and 13b have optical transparency that transmit visible light. The material that can be used for forming the respective transparent electrodes may be any of metal oxides, organic polymers, metal nanowires, carbon nanotubes (CNT), and the like. Examples of the metal oxide include indium tin oxide (ITO), tin oxide (TO), zinc oxide (ZnO), and fluorine-doped tin oxide (FTO). The organic polymer may be a polymer having both optical transparency and electrical conductivity.

<Polarizing Layer>

The polarizing layer 14 includes a polarizer. For example, the polarizer may be formed by allowing a resin film to adsorb dichroic dyes and then stretching the dye-adsorbed film in a predetermined direction. For example, the material that can be used for forming the film may be polyvinyl alcohol, polyethylene terephthalate, or the like. The dichroic dyes may be dyes that contain iodine, organic dyes, or the like.

<Orientation Layer>

The orientation layers forming the pair of orientation layers each have optical transparency that transmit visible light. In the initial orientation of the liquid crystal molecules 12c1 and the dichroic dyes 12c2, the pair of orientation layers orient the liquid crystal molecules 12c1 and the dichroic dyes 12c2 horizontally to the pair of orientation layers and also such that an absorption axis of the polarizing layer 14 is perpendicular to absorption axes of the dichroic dyes 12c2 as viewed in the thickness direction of the light control layer 12.

Therefore, both the first and second orientation layers 11a and 11b are horizontal orientation layers. Specifically, the orientation layers each have an orientation regulation force orienting the liquid crystal molecules 12c1 such that the long axes of the liquid crystal molecules 12c1 become parallel to the plane in which the orientation layer extends. Moreover, the orientation layers each have an orientation regulation force orienting the liquid crystal molecules 12c1 such that the long axes of the liquid crystal molecules 12c1, which are to be oriented by the orientation layers, become parallel to each other. According to such orientation layers, the initial orientation of the liquid crystal molecules 12c1 and the dichroic dyes 12c2 can be a horizontal orientation. It should be noted that the horizontal orientation is also referred to as a homogeneous orientation. As viewed in the thickness direction of the light control sheet 10, the orientation layers further orient the liquid crystal molecules 12c1 and the dichroic dyes 12c2 such that long axes of the liquid crystal molecules 12c1 are perpendicular to an absorption axis of the polarizing layer 14.

The orientation layers may be embodied by photo-orientation layers exerting a predetermined orientation regulation force by light irradiation. The orientation layers can be formed by the following method. First, polyimide films are prepared. Then, a surface of each film to be in contact with the light control layer 12 of the light control sheet 10 is subjected to a rubbing treatment suitable for the initial orientation of the liquid crystal molecules 12c1. Thus, the orientation layers can be obtained.

<Light Control Layer>
<Liquid Crystal Composition>

The liquid crystal composition 12c may contain or may optionally not contain an unreacted part of a UV-polymerizable compound 12c3 that has been used for forming the polymer network 12a, in addition to the liquid molecules 12c1 and the dichroic dyes 12c2.

The liquid crystal molecules 12c1 may be liquid crystal molecules which have a nematic liquid crystal phase and a positive dielectric anisotropy. By using such liquid crystal molecules having both a positive dielectric anisotropy and a nematic liquid crystal phase as the liquid crystal molecules 12c1, the orientation of the liquid crystal molecules 12c1 changes from a horizontal orientation to a vertical orientation upon application of a driving voltage to the pair of transparent electrodes. The orientation of the liquid crystal molecules 12c1 changes from a horizontal orientation to a vertical orientation, so that the orientation of the dichroic dyes 12c2 also changes from a horizontal orientation to a vertical orientation.

It should be noted that, in the light control layer 12 of the present embodiment, a refractive index anisotropy of the liquid crystal molecules 12c1 is preferably 0.1 or less. The refractive index anisotropy Δn is represented by the following formula.

$$\Delta n = n_e - n_o \quad \text{Formula (1)}$$

In Formula (1), $n_e$ is an extraordinary refractive index, and $n_o$ is an ordinary refractive index.

The dichroic dyes 12c2 correspond to dye molecules exhibiting anisotropy when absorbing visible light. The color of the light that has passed through the light control layer 12 depends on the direction in which the long axes of the dichroic dyes 12c2 extend, i.e., the direction in which the absorption axis extends. The dichroic dyes 12c2 may contain only one kind of dye or may contain a plurality of kinds of dyes. For example, when the light control layer 12 is configured to exhibit a black color and the dichroic dyes 12c2 contain only one kind of dye, the dichroic dyes 12c2 may be black dyes, i.e., dyes that absorb most of the light having a wavelength in the wavelength range of visible light. When the light control layer 12 contains a plurality of kinds of dyes as the dichroic dyes 12c2, the dichroic dyes 12c2 may be a plurality of kinds of dyes having absorption wavelength bands different from each other in the wavelength range of visible light.

The dichroic dyes 12c2, when containing a plurality of kinds of dyes, may be produced, for example, by mixing three dyes which are yellow, red and blue. It should be noted that the absorption wavelength band of the yellow dye includes the shortest wavelength range among the three dyes. The absorption wavelength band of the blue dye includes the longest wavelength range among the three dyes. The absorption wavelength band of the red dye includes a wavelength range between the absorption wavelength bands of the other dyes. The absorption wavelength band of each dye may include part of the absorption wavelength bands of the other dyes. For example, the dichroic dyes 12c2 may be azo dyes, anthraquinone dyes, naphthoquinone dyes, or the like.

<Polymer Network>

The material that can be used for forming the polymer network 12a may be a UV-polymerizable compound 12c3. The UV-polymerizable compound 12c3 polymerizes with another UV-polymerizable compound 12c3 upon UV light irradiation to thereby form a polymer network 12a. The polymer network 12a may contain optically isotropic polymer molecules, or may contain liquid crystal polymer molecules. In other words, the UV-polymerizable compound 12c3 may be an optically isotropic compound or may be a compound containing liquid crystal molecules.

The optically isotropic compound may be a monofunctional UV-polymerizable compound, a bifunctional UV-polymerizable compound or a polyfunctional UV-polymerizable compound. Examples of the monofunctional UV-polymerizable compound include acrylate compounds, methacrylate compounds and oligomers of these compounds. Examples of the acrylate compound include butyl ethyl acrylate and cyclohexyl acrylate. Examples of the methacrylate compound include N,N-dimethylaminoethyl methacrylate and phenoxyethyl methacrylate.

Examples of the bifunctional UV-polymerizable compound include stilbene compounds, diacrylate compounds, dimethacrylate compounds and oligomers of these compounds. Examples of the polyfunctional UV-polymerizable compound include triacrylate compounds, tetraacrylate compounds, trimethacrylate compounds, tetramethacrylate compounds and oligomers of these compounds.

In the configuration in which the polymer network 12a contains optically isotropic polymer molecules and the liquid crystal molecules 12c1 are in the vertical orientation, the polymer molecules preferably have a refractive index that is substantially equal to an average refractive index of the liquid crystal molecules 12c1. It should be noted that the average refractive index of the liquid crystal molecules 12c1 is obtained by averaging the extraordinary refractive index and the ordinary refractive index in the liquid crystal molecules 12c1.

The UV-polymerizable compound 12c3 may contain only one kind of compound or more contain two or more kinds of compounds described above. To promote formation of the polymer network 12a, the liquid crystal composition 12c may contain a polymerization initiator that generates radicals under UV light irradiation.

The compound containing liquid crystal molecules can be any of a main-chain mesogenic compound, a side-chain mesogenic compound, and a composite mesogenic compound. The mesogenic compound contains a mesogenic group having a rod or plate shape and containing an aromatic ring. The main-chain mesogenic compound is a mesogenic compound containing a mesogenic group only in the main chain, and the side-chain mesogenic compound is a mesogenic compound containing a mesogenic group only in the side chain. The composite mesogenic compound is a mesogenic compound containing mesogenic groups both in the main chain and in the side chain.

In the liquid crystal polymer molecules contained in the polymer network 12a, the orientation of a unit structure, i.e., the structure for the liquid crystal molecules before polymerization, for forming the polymer molecules is fixed to the orientation determined by the orientation regulation force of the orientation layers. The pair of orientation layers are formed such that the liquid crystal molecules 12c1 filled in the domains 12b are horizontally oriented, as described above. Therefore, the orientation of the unit structure contained in the polymer network 12a, i.e., the orientation of the liquid crystal molecules, is fixed to a horizontal orientation.

In the light control layer 12, the surface contacting the first orientation layer 11a is a front surface, and the surface contacting the second orientation layer 11b is a back surface. On the front and back surfaces of the light control layer 12, the length of the region occupied by each domain 12b contained in the polymer network 12a is a domain diameter of the domain 12b. The length of the region occupied by each domain 12b corresponds to the diameter of the domain 12b that is defined by a phantom circle as a result of the image analysis thereof described above. For example, the average domain diameter may be 0.1 μm or more and 5 μm or less, more preferably 0.2 μm or more and 3 μm or less, and even more preferably 0.5 μm or more and 2 μm or less.

Since the average domain diameter is 0.1 μm or more, the adhesion of the liquid crystal molecules 12c1 contained in the domains 12b to portions defining the domains 12b in the polymer network 12a is suppressed, thereby minimizing the difficulty in changing the orientation of the liquid crystal molecules 12c1 positioned in the domain 12b. Also, since the average domain diameter is 5 μm or less, the average domain diameter is sufficiently small relative to the thickness of the light control layer 12, so that the polymer network 12a is easily formed.

In the liquid crystal molecules 12c1, it is preferred that an extraordinary refractive index $n_e$ is larger than an ordinary refractive index $n_o$, and that a difference between a refractive index $n_p$ of the polymer network and the ordinary refractive index $n_o$ is smaller than a difference between the extraordinary refractive index $n_e$ and the ordinary refractive index $n_o$. Thus, the refractive index $n_p$ of the polymer network 12a approaches the ordinary refractive index $n_o$. Therefore, when light is incident on the horizontally oriented liquid crystal molecules 12c1, the difference between the refractive index of the liquid crystal molecule 12c1, i.e., the extraordinary refractive index $n_e$ and the refractive index $n_p$ of the polymer network 12a can approach the difference between the extraordinary refractive index $n_e$ and the ordinary refractive index $n_o$. Therefore, when the light control layer 12 is opaque, scattering of light within the light control layer 12 easily occurs. As a result, the difference in transmittance between the case where the light control layer 12 is transparent and the case where it is opaque can be increased.

It is more preferred that the refractive index $n_p$ of the polymer network 12a is equal to the ordinary refractive index $n_o$. When light is incident on the horizontally oriented liquid crystal molecules 12c1, the difference between the refractive index of the liquid crystal molecules 12c1 and the refractive index $n_p$ of the polymer network 12a can be made equal to the difference between the extraordinary refractive index $n_e$ and the ordinary refractive index $n_o$. Therefore, when the light control layer 12 is opaque, scattering of light within the light control layer 12 more easily occurs.

Further, it is preferred that the three refractive indexes: the refractive index $n_p$ of the polymer network 12a, the extraordinary refractive index $n_e$ of the liquid crystal molecules 12c1 and the ordinary refractive index $n_o$ of the liquid crystal molecules 12c1, have a maximum value and a minimum value with a difference of 0.16 or less therebetween. Excessive increase of scattering of light incident on the light control layer 12 can also be suppressed by defining the difference in refractive index between the polymer network 12a and the liquid crystal molecules 12c1 positioned in the domains 12b that are defined by the polymer network 12a as 0.16 or less. Thus, the reduction in transmittance when the light control layer 12 is transparent is suppressed.

Figure 3:
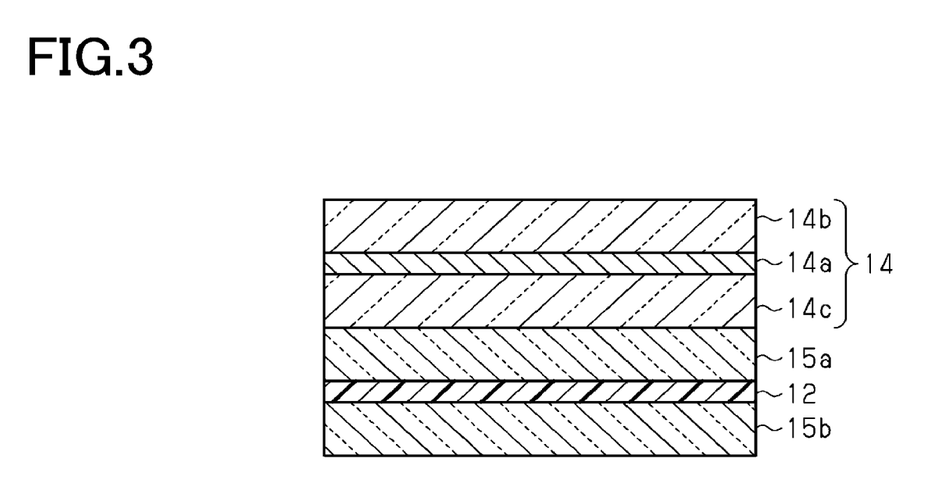
FIG. 3 is a cross-sectional view illustrating a first example of a light control layer and a polarizing layer in the light control sheet of the embodiment.
Figure 4:
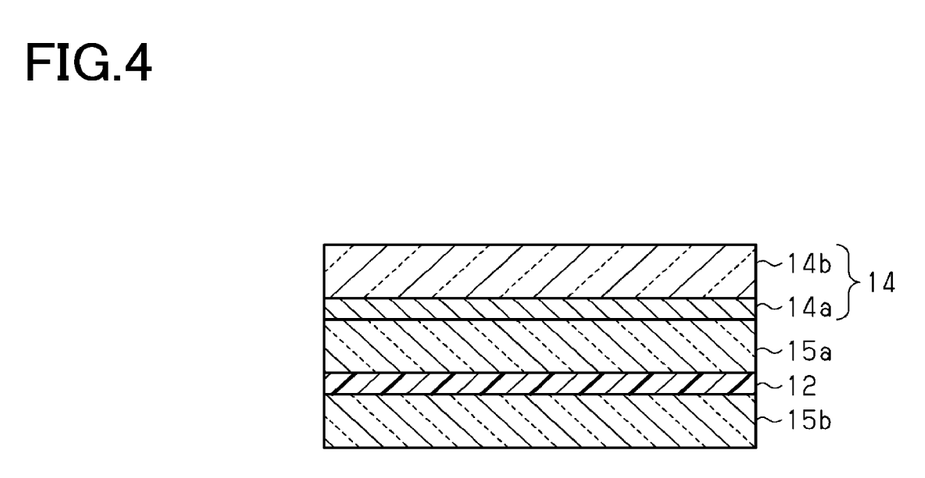
FIG. 4 is a cross-sectional view illustrating a second example of the light control layer and the polarizing layer in the light control sheet of the embodiment.

With reference to FIGS. 3 and 4, the structures of the light control layer 12 and the polarizing layer 14 in the light control sheet 10 described above will now be more specifically explained. Hereinafter, a first example of the light control layer 12 and the polarizing layer 14 will be described with reference to FIG. 3, and a second example of the light control layer 12 and the polarizing layer 14 will be described with reference to FIG. 4. It should be noted that, in FIGS. 3 and 4, the first orientation layer 11a and the first transparent electrode 13a positioned between the first transparent substrate 15a and the light control layer 12 and the second orientation layer 11b and the second transparent electrode 13b positioned between the second transparent substrate 15b and the light control layer 12 are not shown for convenience of illustration.

As shown in FIG. 3, the polarizing layer 14 is composed of a polarizer 14a, a first transparent film 14b, and a second transparent film 14c. The polarizer 14a is sandwiched between the first and second transparent films 14b and 14c in the thickness direction of the polarizing layer 14. The first and second transparent films 14b and 14c can be, for example, films made of triacetyl cellulose (TAC). The polarizer 14a can be a resin film containing dichroic dyes, as described above.

The light control layer 12 has a thickness of, for example, 5 μm or more and 30 μm or less, and the first and second transparent substrates 15a and 15b sandwiching the light control layer 12 each have a thickness of, for example, 50 μm. In the light control layer 12, a trade-off relationship is established in which the increase of the thickness of the light control layer 12 can deepen the color thereof, but, on the other hand, increases the haze thereof. Therefore, the light control layer 12 is preferably thick in order to deepen the color of the light control layer 12, but is preferably thin in order to reduce the haze thereof. The thickness of the light control layer 12 can be appropriately selected according to the use purpose of the light control sheet. In the polarizing layer 14, the polarizer 14a has a thickness of, for example, 20 μm, and the first and second transparent films 14b and 14c each have a thickness of, for example, 50 μm.

When no driving voltage is applied to the light control layer 12, the thickness of the layers positioned between the light control layer 12 and the polarizer 14a and the number of such layers are preferably small, in order to suppress the transmission, through the polarizing layer 14, of light having passed through the light control layer 12. Thus, the transmission, through the polarizer 14a, of light having passed through the light control layer 12 can be suppressed, for example, by refraction of light generated at an interface between the layers positioned between the light control layer 12 and the polarizer 14a.

Therefore, in the polarizing layer 14, the second transparent film 14c preferably has a thickness smaller than that of the first transparent film 14b. Thus, the transmission, through the polarizer 14a, of light having passed through the light control layer 12 is suppressed as compared with the case where the thickness of the second transparent film 14c is equal to or larger than that of the first transparent film 14b. Also, in the two transparent films sandwiching the light control layer 12, the first transparent substrate 15a preferably has a thickness smaller than that of the second transparent substrate 15b.

It should be noted that non-stretched films are used for the first and second transparent films 14b and 14c. Also, non-stretched films are preferably used for the first and second transparent substrates 15a and 15b. Uniaxially-stretched films or biaxially-stretched films can also be used for the first and second transparent substrates 15a and 15b.

When the first and second transparent substrates 15a and 15b are uniaxially-stretched films, the light control layer 12 is preferably sandwiched by the two films such that the film stretching direction extends in a direction parallel or perpendicular to the absorption axis of the light control layer 12. When the first and second transparent substrates 15a and 15b are biaxially-stretched films, the light control layer 12 is preferably sandwiched by the two films such that one of the film stretching directions extends in a direction parallel or perpendicular to the absorption axis of the light control layer 12.

Alternatively, when the first and second transparent substrates 15a and 15b are uniaxially-stretched films, the light control layer 12 is preferably sandwiched by the two films such that the film stretching direction extends in a direction parallel or perpendicular to the absorption axis of the polarizer 14a. When the first and second transparent substrates 15a and 15b are biaxially-stretched films, the light control layer 12 is preferably sandwiched by the two films such that the film stretching direction extends in a direction parallel or perpendicular to the absorption axis of the polarizer 14a.

As shown in FIG. 4, the polarizing layer 14 is provided with the polarizer 14a and the first transparent film 14b, but may optionally not be provided with the second transparent film 14c. In other words, the polarizing layer 14 may be composed of the polarizer 14a contacting the first transparent substrate 15a, and the first transparent film 14b positioned on the opposite side of the polarizer 14a to the first transparent film 15a and contacting the polarizer 14a.

Due to the fact that the polarizing layer 14 is not provided with the second transparent film 14c, the thickness of the layers positioned between the light control layer 12 and the polarizer 14a and the number of such layers can be reduced as compared with the case where the transparent films are positioned on both sides of the polarizer 14a in the thickness direction of the light control sheet 10. Thus, the transmission, through the polarizer 14a, of light having passed through the light control layer 12 is suppressed.

<Effect of Light Control Sheet>

The effects of the light control sheet 10 will be described with reference to FIGS. 1, 2, and 5 to 8. The light control sheet 10 is in a normal mode, as will be described below. Specifically, the light control sheet 10 is opaque when no driving voltage is applied between the transparent electrodes, and is transparent when a driving voltage is applied between the transparent electrodes.

As shown in FIG. 1, when no driving voltage is applied between the transparent electrodes, both the orientations of the liquid crystal molecules 12c1 and dichroic dyes 12c2 contained in the liquid crystal composition 12c are horizontal orientations. At this time, absorption axes of the dichroic dyes 12c2 and an absorption axis of the polarizing layer 14 are perpendicular to each other as viewed in the thickness direction of the light control sheet 10. Therefore, light incident on the light control sheet 10 from the polarizing layer 14 is almost absorbed by the dichroic dyes 12c2 contained in the light control layer 12. Thus, the light incident via the polarizing layer 14 is not emitted from the second transparent substrate 15b. Part of the light incident on the light control sheet 10 from the second transparent substrate 15b is absorbed by the dichroic dyes 12c2 contained in the light control layer 12. The light not absorbed by the dichroic dyes 12c2 hardly passes through the polarizing layer 14. In this manner, the light control sheet 10 exhibits a specific color both when visually recognized from a direction facing the polarizing layer 14 and when visually recognized from a direction facing the second transparent substrate 15b. It should be noted that, depending on the wavelength which can be absorbed by the dichroic dyes 12c2, the light incident on the dichroic dyes 12c2 and having a wavelength not absorbed by the dichroic dyes 12c2 is emitted from the light control sheet 10.

As shown in FIG. 2, when a drive section D applies a driving voltage between the transparent electrodes, the orientation of the liquid crystal molecules 12c1 changes from a horizontal orientation to a vertical orientation. In this case, the orientation of the dichroic dyes 12c2 also changes from a horizontal orientation to a vertical direction. Therefore, the light incident on the light control sheet 10 from the polarizing layer 14 is hardly absorbed by the dichroic dyes 12c2 and is emitted from the second transparent substrate 15b to the outside of the light control sheet 10. The light incident on the light control sheet 10 from the second transparent substrate 15b is also hardly absorbed by the dichroic dyes 12c2. Part of the light not absorbed by the dichroic dyes 12c2 passes through the polarizing layer 14. In this manner, the light control sheet 10 is transparent both when visually recognized from a direction facing the polarizing layer 14 and when visually recognized from a direction facing the second transparent substrate 15b.

Figure 5:
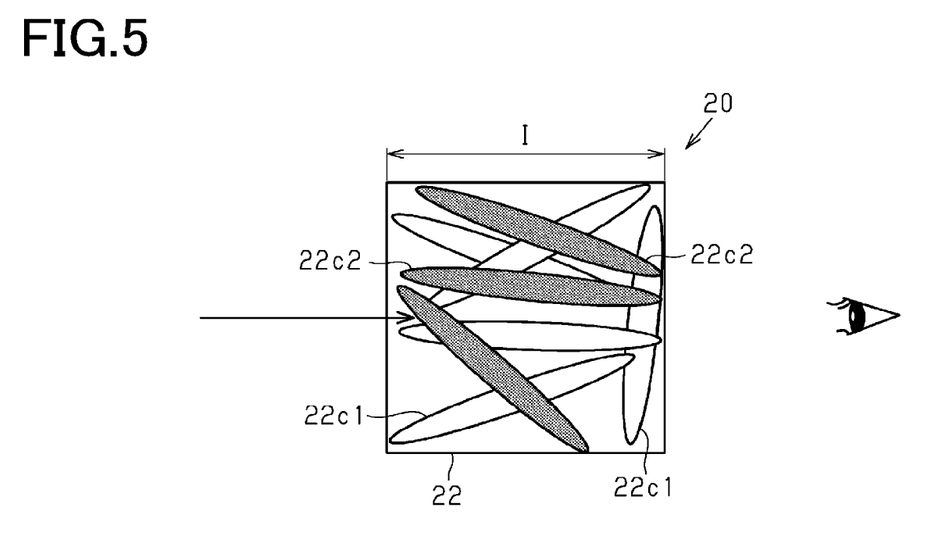
FIG. 5 is a diagram explaining effects of a conventional light control sheet.
Figure 6:
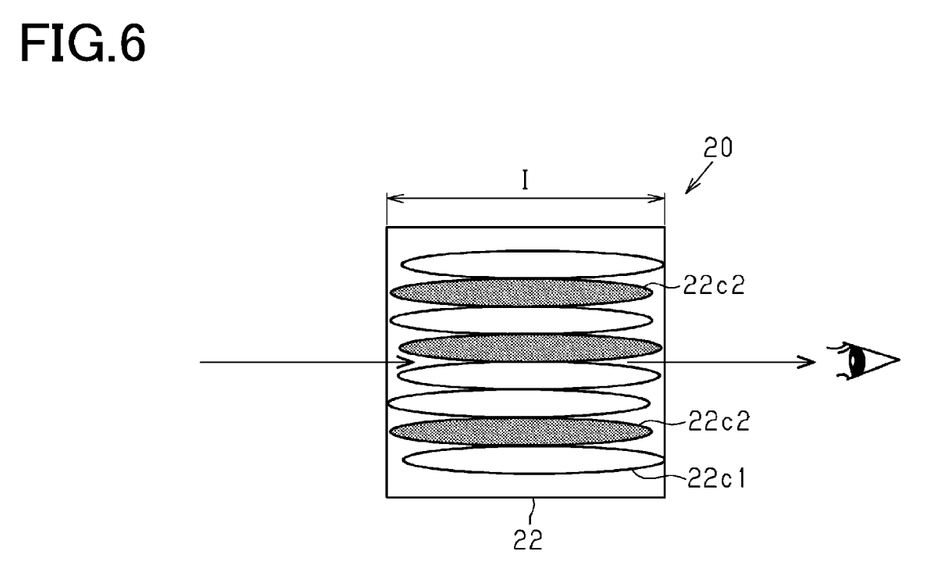
FIG. 6 is a diagram explaining effects of the conventional light control sheet.
Figure 7:
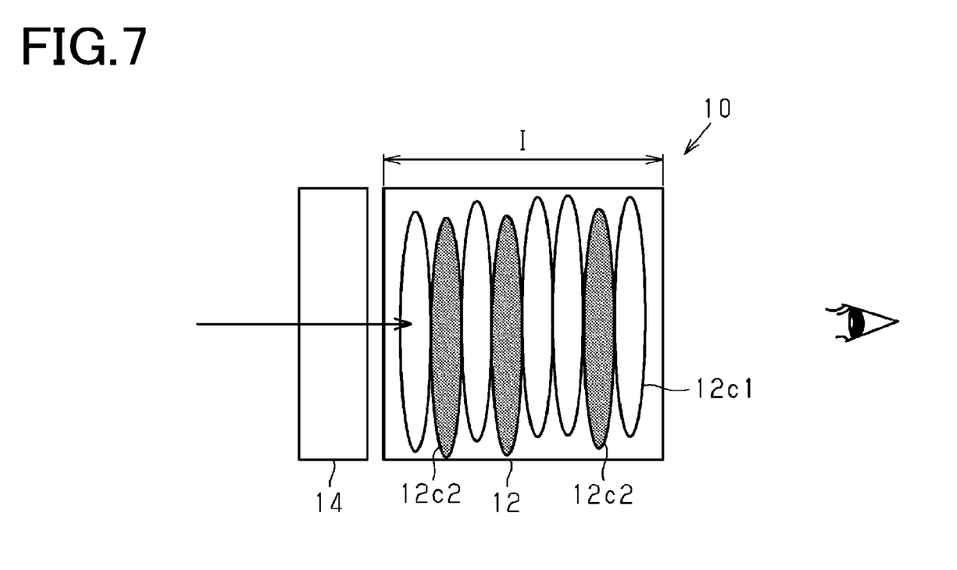
FIG. 7 is a diagram explaining effects of the light control sheet of the embodiment.
Figure 8:
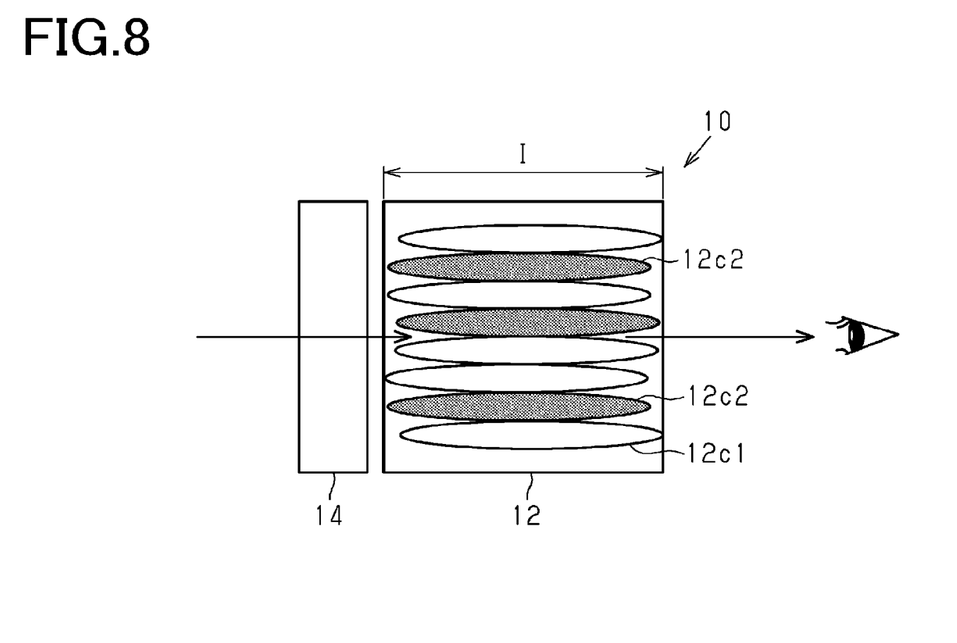
FIG. 8 is a diagram explaining effects of the light control sheet of the embodiment.

FIGS. 5 and 6 show a conventional light control sheet, i.e., a light control sheet in a normal mode having no orientation layer. FIGS. 7 and 8 show the light control sheet 10 of the present embodiment. It should be noted that, for ease of explaining the state of the liquid crystal molecules and dichroic dyes in the light control sheet in FIGS. 5 to 8, FIGS. 5 and 6 show only the light control layer, whereas FIGS. 7 and 8 show only the light control layer and the polarizing layer. In FIGS. 5 to 8, the liquid crystal molecules and dichroic dyes provided to the light control layer are exaggerated and domains are not shown for convenience of illustration. In FIGS. 5 to 8, FIGS. 5 and 7 show a state in which no driving voltage is applied between transparent electrodes, and FIGS. 6 and 8 show a state in which a driving voltage is applied between the transparent electrodes.

As shown in FIG. 5, in a conventional light control sheet 20, when no driving voltage is applied between the transparent electrodes, a plurality of liquid crystal molecules 22c1 and a plurality of dichroic dyes 22c2 are oriented at random in a light control layer 22. Therefore, an extinction coefficient ε of the light control layer 22 can be represented by the following Formula (2).

$$\varepsilon = (2\varepsilon\perp + \varepsilon//)/3 \qquad \text{Formula (2)}$$

In the above formula, $\varepsilon\perp$ is an extinction coefficient in a direction perpendicular to the long axis direction of the dichroic dyes 22c2, and $\varepsilon//$ is an extinction coefficient in a direction parallel to the long axis direction of the dichroic dyes 22c2. Hereinafter, $\varepsilon\perp$ is defined as first extinction coefficient, and $\varepsilon//$ is defined as second extinction coefficient. The second extinction coefficient $\varepsilon//$ is larger than the first extinction coefficient $\varepsilon\perp$.

An optical path length of the light control layer 22 is a product (I·n) of a thickness I of the light control layer 22 and a refractive index n thereof. An absorbance A1 of the light control layer 22 can be represented by the following Formula (3), using Formula (2) shown above and the optical path length (I·n).

$$A1 = (2\varepsilon\perp + \varepsilon//)/3 \cdot I \cdot n \cdot c \qquad \text{Formula (3)}$$

In the above formula, c is a dye concentration of the light control layer 22. As the optical path length of the light control layer 22 increases and the dye concentration c increases, scattering of light within the light control layer 22 easily occurs, and transparency of the light control layer 22 decreases.

As shown in FIG. 6, when a driving voltage is applied between the transparent electrodes in the light control sheet 20, the plurality of liquid crystal molecules 22c1 are oriented vertically in the light control layer 22, so that the plurality of dichroic dyes 22c2 are also oriented vertically. At this time, the extinction coefficient ε of the light control layer 22 is the second extinction coefficient $\varepsilon\perp$, and the optical path length is equal to the thickness I of the light control layer 22. Therefore, an absorbance A2 of the light control layer 22 can be represented by the following Formula (4):

$$A2 = \varepsilon\perp \cdot I \cdot c \qquad \text{Formula (4)}$$

Contrary to this, as shown in FIG. 7, in the light control sheet 10 of the present embodiment, an extinction coefficient c of the light control layer 12 with respect to the light incident on the light control sheet 10 from the polarizing layer 14 is the second extinction coefficient $\varepsilon//$, when no driving voltage is applied to the light control layer 12. An optical path length of the light control layer 12 is a product (I·n') of a thickness I of the light control layer 12 and a refractive index n' thereof. An absorbance A3 of the light control layer 12 can be represented by the following Formula (5), using the extinction coefficient ε, the optical path length (I·n') and the dye concentration c.

$$A3 = \varepsilon // \cdot I \cdot n' \cdot c \quad \text{Formula (5)}$$

As shown in FIG. 8, when a driving voltage is applied to the light control layer 12, an absorbance A2 of the light control layer 12 can be represented by Formula (4) shown above, like the conventional light control sheet 20.

As is evident from Formulas (3) and (5), an absorbance A3 of the light control layer 12 is larger than the absorbance A1 of the light control layer 22. Therefore, on the premise that the two light control layers 12 and 22 are equal in optical path length and the dye concentration c, the amount of light absorbed by the light control layer 12 becomes larger, with the result that the color development of the light control layer 12 is enhanced. On the other hand, when the absorbance A equivalent to that of the light control layer 12 is realized in the light control layer 22, at least one of the dye concentration c and the thickness I must be increased. In other words, in the light control sheet 10 of the present embodiment, the color development of the light control layer 12 can be enhanced without increasing the dye concentration c and the thickness I of the light control layer 12, and further, without increasing the thickness of the light control sheet 10, so that the color development and transparency can be improved.

Other Examples of Light Control Sheet

Other examples of the light control sheet will be described with reference to FIG. 9.

Figure 9:
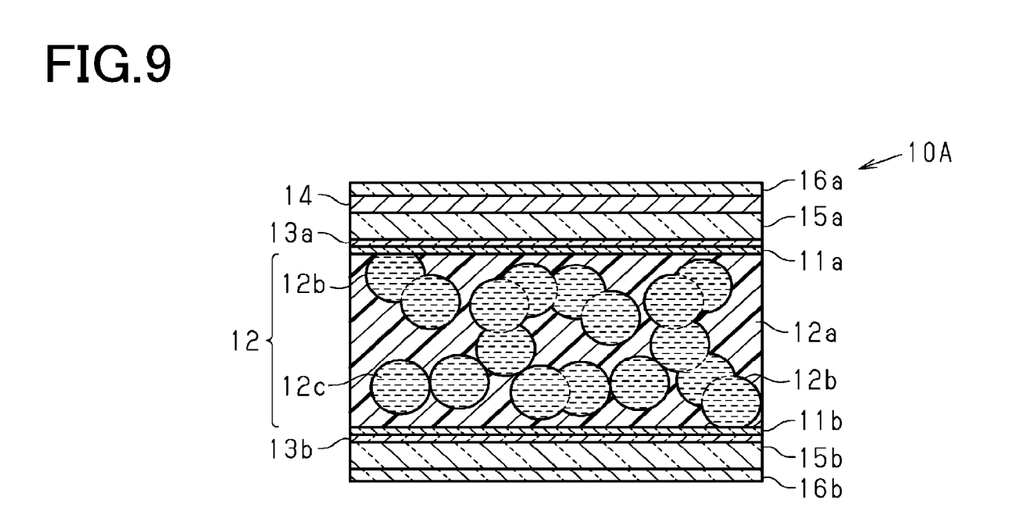
FIG. 9 is a cross-sectional view illustrating another structure of the light control sheet according to the embodiment.

As shown in FIG. 9, a light control sheet 10A has a structure in which a first hard coat layer 16a and a second hard coat layer 16b are additionally provided to the light control sheet 10 described above.

The first hard coat layer 16a is positioned on the opposite side of the polarizing layer 14 to the first transparent electrode 13a. The second hard coat layer 16b is positioned on the opposite side of the second transparent electrode 13b to the second orientation layer 11b. In the present embodiment, the first hard coat layer 16a is positioned outside the polarizing layer 14, and the second hard coat layer 16b is positioned outside the second transparent substrate 15b.

The hard coat layers are positioned outside the polarizing layer 14 and the second transparent substrate 15b, respectively. Hence, at least one of chemical and physical damage is suppressed in the layers positioned inside the hard coat layers as compared with a structure having no hard coat layer. Among the plurality of layers provided to the light control sheet 10, the polarizing layer 14 and the second transparent substrate 15b are covered with the hard coat layers, and thus are hardly exposed to the outside of the light control sheet 10. Therefore, damage is especially suppressed as compared with a structure having no hard coat layer.

The light control sheet 10A includes both the first hard coat layer 16a and the second hard coat layer 16b, but may have a configuration provided with only one of these hard coat layers.

<Configuration of Light Control Window>

The configuration of the light control window will be described with reference to FIGS. 10 to 12. Hereinafter, an example in which the light control window is embodied as a part of a vehicle body provided to a vehicle will be described.

Figure 10:
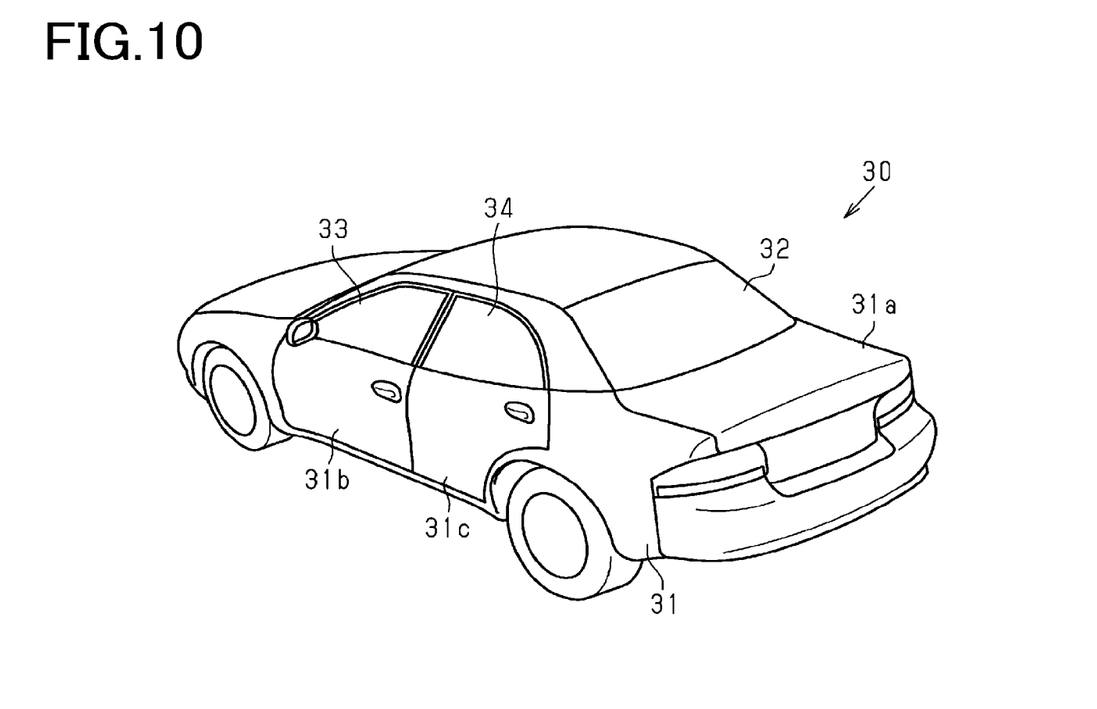
FIG. 10 is a perspective view illustrating a structure of a vehicle.

As shown in FIG. 10, a vehicle body 31 of a vehicle body 30 is provided with a main body 31a, a front door 31b, and a rear door 31c. A rear glass 32 is fitted into an opening of the main body 31a. A front door glass 33 is fitted into an opening of the front door 31b. A rear door glass 34 is fitted into an opening of the rear door 31c.

For example, the rear glass 32 and the rear door glass 34, in the vehicle body 31, are examples of transmission sections that transmit light. The main body 31a and the rear door 31c are examples of frame bodies surrounding the transmission sections. The light control sheets 10 and 10A described above are positioned on the rear glass 32 and the rear door glass 34. According to such a configuration, the rear glass 32 and the rear door glass 34 are visually recognized by an observer as if the state of the rear glass 32 and the rear door glass 34 has been switched between a transparent state and an opaque state, in response to the application of a driving voltage to the pair of transparent electrodes.

The light control sheets 10 and 10A may be positioned only on the rear glass 32 or the rear door glass 34. Alternatively, the light control sheets 10 and 10A may be positioned on the front door glass 33. In short, the light control sheets 10 and 10A have only to be positioned on at least one of the rear glass 32, the front door glass 33, and the rear door glass 34. The transmission sections that are applicable to the rear glass 32, the front door glass 33 and the rear door glass 34 may not only be those formed of glass, but may also be those formed from a resin having optical transparency.

These light control sheets 10 and 10A for the vehicle 30 are required to exhibit a black color for the purpose of protecting the privacy of a passenger of the vehicle 30, and enhancing the design and sense of luxury of the vehicle 30. The light control sheet 10 is required to provide high color development in order to enhance the black-color grade exhibited by the light control sheet 10. On the other hand, the light control sheet 10 is also required to have high transparency for easy visual recognition of the outside from the inside of the passenger compartment. The light control sheets 10 and 10A of the present embodiment can satisfy these requirements.

Hereinafter, first and second examples of the light control window including the rear glass 32 and the light control sheet 10 will be described with reference to FIGS. 11 and 12. It should be noted that, in FIGS. 11 and 12, among the layers forming the light control sheet 10, only the light control layer 12 and the polarizing layer 14, are shown for convenience of illustration.

First Example

Figure 11:
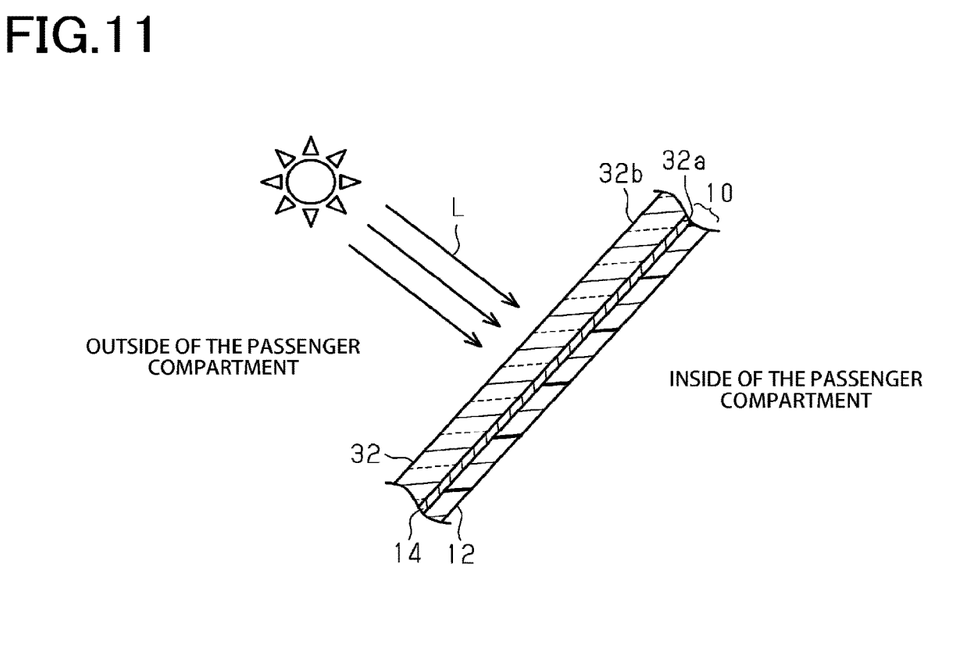
FIG. 11 is a cross-sectional view illustrating a structure of a first example of a light control window.

As shown in FIG. 11, the light control window includes the rear glass 32 and the main body 31a, and forms a part of the vehicle body 31 defining a passenger compartment. The rear glass 32 is an example of a plate member including an inner surface 32a having optical transparency and facing the inside of the passenger compartment and an outer surface 32b facing the outside of the passenger compartment. The transmission section fitted into the main body 31a may include a member other than the rear glass 32. The light control sheet 10 is positioned on the inner surface 32a such that the polarizing layer 14 is sandwiched between the rear glass 32 and the light control layer 12.

That is, the polarizing layer 14 of the light control sheet 10 is adhered to the inner surface 32a of the rear glass 32 by an adhesive or a pressure-sensitive adhesive having optical transparency. When the light control sheet 10A described above is applied to the light control window, the first hard coat layer 16a is positioned on the inner surface 32a of the rear glass 32, and the second hard coat layer 16b is positioned on a surface, exposed to the inside of the passenger compartment, of the light control sheet 10A. Since the second hard coat layer 16b has a surface, exposed to the inside of the passenger compartment, of the light control sheet 10A, the light control layer 12 forming the light control sheet 10 is unlikely to be damaged even when the light control sheet 10 is touched by a passenger of the vehicle 30.

Since the light control sheet 10 is positioned on the inner surface 32a of the rear glass 32, the light control sheet 10 is less likely to be exposed to moisture and the like, as compared with the case where the light control sheet 10 is positioned on the outer surface 32b of the rear glass 32. Therefore, the weather resistance required of the light control sheet 10 may be low. Thus, the degree of freedom in the material for forming the light control sheet 10 is less likely to be limited by the performance required of the light control sheet 10. Since the polarizing layer 14 is positioned closer to the rear glass 32 than the light control layer 12 is, only part of light L incident on the light control sheet 10 from the polarizing layer 14 is incident on the light control layer 12. Therefore, as compared with the case where the light L is incident on the light control layer 12 without passing through the light control layer 14, the components of the light L incident on the light control layer 12 are limited, so that the light control layer 12 is resistant to deterioration.

In the first example of the light control window, the polarizing layer 14 preferably has a thickness of 25 μm or more and 120 μm or less. The rear glass 32 forming the vehicle body 31 often has a shape with a curvature. In this regard, when the polarizing layer 14 has a thickness of 25 μm or more and 120 μm or less, the thickness of the polarizing layer 14 is suppressed from causing the difficulty in adhering the light control sheet 10 to the rear glass 32 having a curvature, while the polarizing layer 14 exerts the function of transmitting specific light components only.

Second Example

Figure 12:
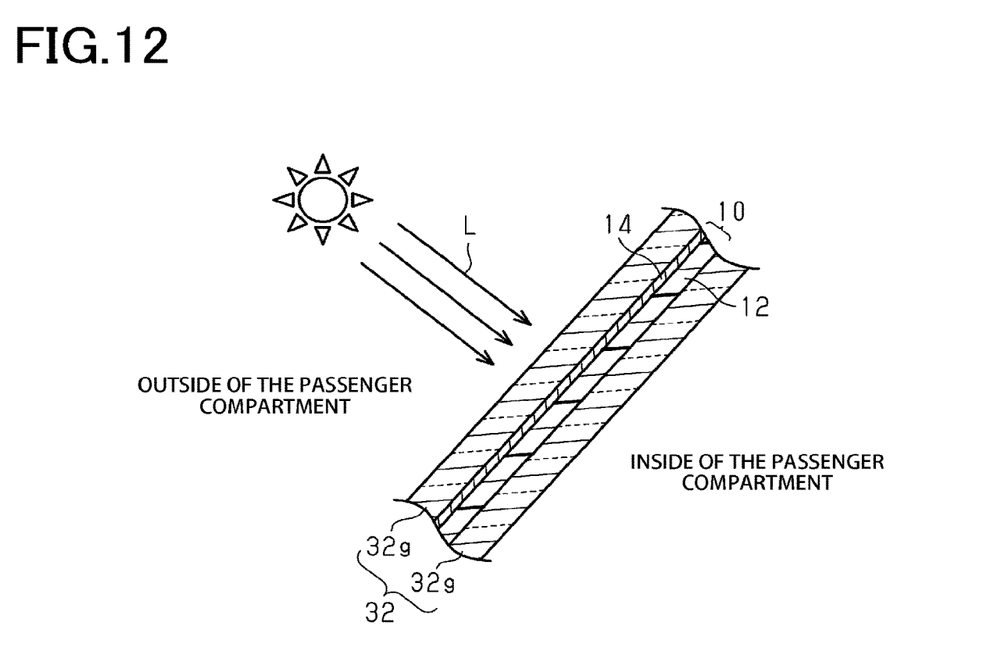
FIG. 12 is a cross-sectional view illustrating a structure of a second example of the light control window.

As shown in FIG. 12, the rear glass 32 includes two glass plates 32g having optical transparency. Each glass plate 32g is an example of a plate member. The light control sheet 10 is sandwiched between the two glass plates 32g. Since the light control sheet 10 is sandwiched between the two glass plates 32g, the light control sheet 10 is protected from at least one of chemical and physical damage by virtue of the glass plates 32g. Therefore, the light control sheet 10 is less likely to be damaged as compared with a configuration in which the light control sheet 10 is retrofitted to the rear glass 32.

The polarizing layer 14 of the light control sheet 10 is positioned closer to the glass plate 32g facing the outside of the passenger compartment than the light control layer 12 is. Thus, the light control layer 12 is less likely to become deteriorated since light is incident on the light control layer 12 via the polarizing layer 14, as with the first example of the light control window described above.

In the second example of the light control window, the polarizing layer 14 preferably has a thickness of 25 μm or more and 120 μm or less. Thus, excessive increase of the total thickness of the light control sheet 10 and the rear glass 32 due to the thickness of the polarizing layer 14 is suppressed while the polarizing layer 14 exerts the function of transmitting specific light components only.

It should be noted that, in the second example of the light control window, the width of the space sandwiched between the two glass plates 32g is sometimes restricted to a predetermined width. The width of the space is sometimes restricted, for example, to 200 μm or 400 μm. The thickness of the light control layer 12 is sufficiently small relative to the width of the space as described above. Accordingly, the thickness of the light control sheet 10 must be adjusted by the layers other than the light control layer 12 in order to define the width of the space as 200 μm or 400 μm.

In this regard, according to the first and second examples of the light control sheet 10, the thickness of the light control sheet 10 can be adjusted by increasing the thickness of the first transparent film 14b provided to the polarizing layer 14 or increasing the thickness of the second transparent substrate 15b. Thus, the thickness of the light control sheet 10 can be adjusted without increasing the thickness of the layers positioned between the light control layer 12 and the polarizer 14a.

As described above, according to the embodiment of the light control sheet and light control window, the following advantageous effects can be obtained.

(1) When no driving voltage is applied between the transparent electrodes, the light control layer 12 is opaque. Since the dichroic dyes 12c2 are oriented horizontally at this time, the absorbance of the light control layer 12 derived from the dichroic dyes 12c2 increases as compared with the configuration in which the dichroic dyes 12c2 are aligned randomly. Therefore, the color development of the light control layer 12 due to the dichroic dyes 12c2 can be enhanced without increasing the thickness of the light control layer 12 or the concentration of the dichroic dyes 12c2, i.e., have a state in which scattering of light within the light control layer 12 is less likely to occur. As a result, both the improvement of color development and the improvement of transparency can be achieved in the light control sheet 10.

(2) The refractive index $n_p$ of the polymer network 12a approaches the ordinary refractive index $n_o$. Therefore, when light is incident on the horizontally oriented liquid crystal molecules 12c1, the difference between the refractive index of the liquid crystal molecule 12c1, i.e., the extraordinary refractive index $n_e$ and the refractive index $n_p$ of the polymer network 12a can approach the difference between the extraordinary refractive index $n_e$ and the ordinary refractive index $n_o$. Therefore, when the light control layer 12 is opaque, scattering of light within the light control layer 12 easily occurs. As a result, the difference in transmittance between the case where the light control layer 12 is transparent and the case where it is opaque can be increased.

(3) When light is incident on the horizontally oriented liquid crystal molecules 12c1, the difference between the refractive index of the liquid crystal molecules 12c1 and the refractive index of the polymer network 12a can be made equal to the difference between the extraordinary refractive index $n_e$ and the ordinary refractive index $n_o$. Therefore, when the light control layer 12 is opaque, scattering of light within the light control layer 12 more easily occurs.

(4) When the second transparent film 14c has a thickness smaller than that of the first transparent film 14b, the transmission, through the polarizer 14a, of light having passed through the light control layer 12 is suppressed as compared with the case where the thickness of the second transparent film 14c is equal to or larger than that of the first transparent film 14b.

(5) Due to the fact that the polarizing layer 14 is not provided with the second transparent film 14c, the thickness of the layers positioned between the light control layer 12 and the polarizer 14a and the number of such layers can be reduced as compared with the configuration in which the transparent films are positioned on both sides of the polarizer 14a in the thickness direction of the light control sheet 10. Thus, the transmission, through the polarizer 14a, of light having passed through the light control layer 12 is suppressed.

(6) When the light control sheet 10 is provided with a hard coat layer, at least one of chemical and physical damage is suppressed in the layers positioned inside the hard coat layers.

(7) The rear glass 32 or the rear door glass 34 is visually recognized by an observer as if the state of the rear glass 32 or rear door glass 34 provided to the light control window has been switched between a transparent state and an opaque state, in response to the application of a driving voltage to the pair of transparent electrodes.

(8) The light L incident on the light control window from the outside of the vehicle body 31 is incident on the light control layer 12 via the polarizing layer 14, and thus the components of the light L incident on the light control layer 12 are limited as compared with the configuration in which the light L is incident on the light control layer 12 without passing through the polarizing layer 14. Thus, the deterioration of the light control layer 12 is suppressed.

(9) Since the polarizing layer 14 has a thickness of 25 μm or more and 120 μm or less in the first example of the light control window, the difficulty in adhering the light control sheet 10 to the rear glass 32 having a curvature due to the thickness of the polarizing layer 14 is minimized, while the polarizing layer exerts the function of transmitting specific light components only.

(10) Since the light control sheet 10 is sandwiched between the two glass plates 32g in the second example of the light control window, the light control sheet 10 is protected from at least one of chemical and physical damage.

(11) In the second example of the light control window, excessive increase of the total thickness of the light control sheet 10 and the transmission section 12 due to the thickness of the polarizing layer 14 is suppressed while the polarizing layer 14 exerts the function of transmitting specific light components only.

The embodiment described above may be appropriately modified and implemented as follows.

The polarizing layer 14 may be positioned between the first transparent electrode 13a and the first transparent substrate 15a. With this configuration as well, the polarizing layer 14 has a function equivalent to that of the polarizing layer 14 when the polarizing layer 14 is positioned outside the first transparent substrate 15a The absorption axes of the dichroic dyes 22c2 and the polarizing layer 14 may cross each other at an angle other than a right angle as viewed in the thickness direction of the light control sheet 10. With this configuration as well, at least part of the light absorbed by the dichroic dyes 12c2 cannot pass through the polarizing layer 14. Accordingly, the advantageous effects described in the above item (1) can be substantially achieved.

The light control layer 12 may exhibit a color other than a black color. For example, the light control layer 12 can also be formed to exhibit a blue color, a red color, or the like by adjusting the components and kinds of the dichroic dyes.

In the light control window, the light control layer 12 may be positioned closer to the outside of the passenger compartment than the polarizing layer 14. Such a configuration can also achieve advantageous effects similar to (7) set forth above.

The polarizing layer 14 is not limited to the first and second examples described above, and can have the following configuration. Specifically, in the polarizing layer 14, the thickness of the second transparent film 14c may be equal to or larger than that of the first transparent film 14b. However, the second transparent film 14c preferably has a thickness smaller than that of the first transparent film 14b for the above reasons. Alternatively, the polarizing layer 14 is preferably not provided with the second transparent film 14c.

The present application relates to the following. It is known that some light control sheets can exhibit a specific color by means of dichroic dyes. Such light control sheets change to a transparent state and to an opaque state with a predetermined color, depending on the driving voltage applied to the light control sheet. Attachment of such a light control sheet to a window provided to a vehicle body has been proposed for the purpose of enhancing the design of a vehicle.

In order to improve transparency of the light control sheet, it is preferable to reduce the thickness of the light control layer of the light control sheet. On the other hand, when the thickness of the light control layer is reduced, the amount of dichroic dye contained in the light control layer is limited by the thickness thereof, leading to the deterioration in color development. Since the improvement of transparency and the improvement of color development are in a trade-off relationship in this manner, a light control sheet that can realize both the improvement of transparency and the improvement of color development is required.

An aspect of the present invention is to provide a light control sheet that can realize both the improvement of transparency and the improvement of color development, and a light control window.

A light control sheet for solving the above problem includes:

a pair of orientation layers including a first orientation layer and a second orientation layer;

a light control layer sandwiched between the first and second orientation layers and containing a polymer network and a plurality of domains dispersed in the polymer network, the plurality of domains being filled with a liquid crystal composition containing liquid crystal molecules and dichroic dyes;

a pair of transparent electrodes sandwiching the pair of orientation layers; and a polarizing layer positioned on the opposite side of the first orientation layer to the light control layer. The transmittance of the light control layer increases upon application of a driving voltage to the pair of transparent electrodes. In a state in which the driving voltage is not applied between the transparent electrodes, the pair of orientation layers orient the liquid crystal molecules and the dichroic dyes horizontally to the pair of orientation layers and also such that absorption axes of the dichroic dyes cross an absorption axis of the polarizing layer as viewed in the thickness direction of the light control layer.

A light control window in an aspect of the present invention includes:

a transmission section that transmits light;

a frame body that surrounds the transmission section; and the light control sheet. The light control sheet is positioned in the transmission section.

In this case, when no driving voltage is applied between the transparent electrodes, the light control sheet is opaque. At this time, the dichroic dyes are oriented horizontally. Therefore, the absorbance of the light control layer derived from the dichroic dyes increases as compared with the case where the dichroic dyes are aligned at random in the light control layer. Hence, there is no need to increase the thickness of the light control layer or the concentration of the dichroic dyes. Thus, the color development of the light control layer due to the dichroic dyes can be enhanced in a state in which scattering of light within the light control layer hardly occurs. As a result, both the improvement of color development and the improvement of transparency can be achieved in the light control sheet.

In the light control sheet described above, the liquid crystal molecules may have an extraordinary refractive index greater than an ordinary refractive index, and a difference between a refractive index of the polymer network and the ordinary refractive index may be smaller than a difference between the extraordinary refractive index and the ordinary refractive index.

In this case, the refractive index of the polymer network approaches the ordinary refractive index. Therefore, when light is incident on the horizontally oriented liquid crystal molecules, the difference between the refractive index of the liquid crystal molecules, i.e., the extraordinary refractive index and the refractive index of the polymer network can approach the difference between the extraordinary refractive index and the ordinary refractive index. Therefore, when the light control layer is opaque, scattering of light within the light control layer easily occurs. As a result, a difference in transmittance between when the light control layer is transparent and when the light control layer is opaque can be increased.

The refractive index of the polymer network may be equal to the ordinary refractive index.

In this case, when light is incident on the horizontally oriented liquid crystal molecules, the difference between the refractive index of the liquid crystal molecules and the refractive index of the polymer network can be made equal to the difference between the extraordinary refractive index and the ordinary refractive index. Therefore, when the light control layer is opaque, scattering of light within the light control layer more easily occurs.

The light control sheet may further include a pair of transparent substrates sandwiching the pair of transparent electrodes. The pair of transparent substrates may include a first transparent substrate and a second transparent substrate, and the first transparent substrate may be positioned between the first orientation layer and the polarizing layer. The polarizing layer may include a polarizer and a pair of transparent films sandwiching the polarizer. The pair of transparent films may include a first transparent film positioned on the opposite side of the polarizer to the first transparent substrate and a second transparent film positioned between the polarizer and the first transparent substrate. The second transparent film may have a thickness smaller than that of the first transparent film.

In this case, the thickness of the layers positioned between the light control layer and the polarizer can be reduced as compared with the case where the thickness of the second transparent film is equal to or larger than that of the first transparent film. Thus, the transmission, through the polarizer, of light having passed through the light control layer is suppressed as compared with the case where the thickness of the second transparent film is equal to or larger than that of the first transparent film.

The light control sheet may further include a pair of transparent substrates sandwiching the pair of transparent electrodes. The pair of transparent substrates may include a first transparent substrate and a second transparent substrate, and the first transparent substrate may be positioned between the first orientation layer and the polarizing layer. The polarizing layer may include a polarizer contacting the first transparent substrate, and a transparent film positioned on the opposite side of the polarizer to the first transparent substrate, and the transparent film contacting the polarizer.

In this case, the polarizing layer is provided only with a transparent film positioned outside the polarizer. Therefore, the thickness of the layers positioned between the light control layer and the polarizer and the number of such layers can be reduced as compared with the case where transparent films are positioned on both sides of the polarizer in the thickness direction of the light control sheet. Thus, the transmission, through the polarizer, of light having passed through the light control layer is suppressed as compared with the case where transparent films are positioned on both sides of the polarizer.

In the light control sheet, the pair of transparent electrodes may include a first transparent electrode sandwiched between the first orientation layer and the polarizing layer and a second transparent electrode positioned on the opposite side of the second orientation layer to the light control layer. The pair of transparent substrates may include the first transparent substrate and the second transparent substrate. The light control sheet may further include at least one of a first hard coat layer positioned on the opposite side of the polarizing layer to the first transparent substrate and a second hard coat layer positioned on the opposite side of the second transparent substrate to the second transparent electrode.

In this case, the light control sheet is provided with a hard coat layer. Hence, at least one of chemical and physical damage is suppressed in the layers positioned inside the hard coat layers.

The light control window may form a part of a vehicle body that defines a passenger compartment. The transmission section may be provided with a plate member. The plate member may have optical transparency, and includes an inner surface facing the inside of the passenger compartment and an outer surface facing the outside of the passenger compartment. The light control sheet may be positioned on the inner surface such that the polarizing layer is sandwiched between the plate member and the light control layer.

In this case, the light incident on the light control window from the outside of the vehicle body is incident on the light control layer via the polarizing layer, and thus the components of the light incident on the light control layer are limited as compared with the case where the light is incident on the light control layer without passing through the polarizing layer. Thus, the deterioration of the light control layer is suppressed.

In the light control window, the polarizing layer may have a thickness of 25 μm or more and 120 μm or less. The transmission section forming the vehicle body often has a shape with a curvature. In this regard, since the polarizing layer has a thickness of 25 μm or more and 120 μm or less in the above case, the difficulty in adhering the light control sheet to the transmission section having a curvature due to the thickness of the polarizing layer is minimized, while the polarizing layer exerts the function of transmitting specific light components only.

In the light control window, the transmission section may include two plate members having optical transparency, and the light control sheet may be sandwiched between the two plate members. According to the configuration, the light control sheet is protected from at least one of chemical and physical damage by virtue of the two plate members.

In the light control window, the polarizing layer may have a thickness of 25 μm or more and 120 μm or less. In this case, excessive increase of the total thickness of the light control sheet and the transmission section due to the thickness of the polarizing layer is suppressed while the polarizing layer exerts the function of transmitting specific light components only.

The embodiments of the present invention can realize both the improvement of transparency and the improvement of color development.

REFERENCE SIGNS LIST 10, 10A, 20 . . . Light control sheet
11a . . . First orientation layer
11b . . . Second orientation layer
12, 22 . . . Light control layer
12a . . . Polymer network
12b . . . Domain
12c . . . Liquid crystal composition
12c1, 22c1 . . . Liquid crystal molecule
12c2, 22c2 . . . Dichroic dye
12c3 . . . UV-polymerizable compound
13a . . . First transparent electrode
13b . . . Second transparent electrode
14 . . . Polarizing layer
14a . . . Polarizer
14b . . . First transparent film
14c . . . Second transparent film
15a . . . First transparent substrate
15b . . . Second transparent substrate
16a . . . First hard coat layer
16b . . . Second hard coat layer
30 . . . Vehicle
31 . . . Vehicle body
31a . . . Main body
31b . . . Front door
31c . . . Rear door
32 . . . Rear glass
32a . . . Inner surface
32b . . . Outer surface
32g . . . Glass plate
33 . . . Front door glass
34 . . . Rear door glass
D . . . Drive section Obviously, numerous modifications and variations of the present invention are possible in light of the above teachings. It is therefore to be understood that within the scope of the appended claims, the invention may be practiced otherwise than as specifically described herein.

What is claimed is:

1. A light control sheet, comprising:
a pair of orientation layers including a first orientation layer and a second orientation layer;
a pair of transparent electrodes sandwiching the pair of orientation layers and comprising a first transparent electrode formed on the first orientation layer and a second transparent electrode formed on the second orientation layer;
a light control layer sandwiched between the first and second orientation layers and configured to increase transmittance upon application of driving voltage to the pair of transparent electrodes; and
a polarizing layer positioned on the first orientation layer of the pair of orientation layers on an opposite side with respect to the light control layer,
wherein the light control layer includes a polymer network and a liquid crystal composition forming a plurality of domains in the polymer network such that the plurality of domains are connected each other through adjacent ones of the domains and have an average domain diameter of 0.1 μM or more, that the liquid crystal composition is continuous through the plurality of domains and that at least one of the domains is in contact with at least one of the first and second orientation layers, and the liquid crystal composition includes a plurality of liquid crystal molecules and a dichroic dye such that when the driving voltage is not applied between the pair of transparent electrodes, the pair of orientation layers orient the liquid crystal molecule and the dichroic dye horizontally to the pair of orientation layers and orient an absorption axis of the dichroic dye to cross an absorption axis of the polarizing layer with respect to a thickness direction of the light control layer.

2. The light control sheet according to claim 1, wherein the liquid crystal molecule has an extraordinary refractive index greater than an ordinary refractive index such that a difference between the extraordinary refractive index and the ordinary refractive index is greater than a difference between the ordinary refractive index of the liquid crystal molecules and a refractive index of the polymer network.

3. The light control sheet according to claim 2, wherein the refractive index of the polymer network is equal to the ordinary refractive index of the liquid crystal molecule.

4. The light control sheet according to claim 3, further comprising:
a pair of transparent substrates sandwiching the pair of transparent electrodes,
wherein the pair of transparent substrates include a first transparent substrate and a second transparent substrate such that the first transparent substrate is positioned between the first orientation layer and the polarizing layer, the polarizing layer includes a polarizer and a pair of transparent films sandwiching the polarizer, the pair of transparent films include a first transparent film positioned on the polarizer on an opposite side with respect to the first transparent substrate and a second transparent film positioned between the polarizer and the first transparent substrate, and the second transparent film has a thickness smaller than a thickness of the first transparent film.

5. The light control sheet according to claim 4, wherein the pair of transparent electrodes include a first transparent electrode sandwiched between the first orientation layer and the polarizing layer and a second transparent electrode positioned on the second orientation layer on an opposite side with respect to the light control layer, the pair of transparent substrates include the first transparent substrate and the second transparent substrate, and the light control sheet further comprises at least one of a first hard coat layer positioned on the polarizing layer on the opposite side with respect to the first transparent substrate and a second hard coat layer positioned on the second transparent substrate on an opposite side with respect to the second transparent electrode.

6. The light control sheet according to claim 3, further comprising:
a pair of transparent substrates sandwiching the pair of transparent electrodes, wherein the pair of transparent substrates include a first transparent substrate and a second transparent substrate such that the first transparent substrate is positioned between the first orientation layer and the polarizing layer, and the polarizing layer includes a polarizer contacting the first transparent substrate and a transparent film positioned on the polarizer on an opposite side with respect to the first transparent substrate, and contacting the polarizer.

7. The light control sheet according to claim 6, wherein the pair of transparent electrodes include a first transparent electrode sandwiched between the first orientation layer and the polarizing layer and a second transparent electrode positioned on the second orientation layer on an opposite side with respect to the light control layer, the pair of transparent substrates include the first transparent substrate and the second transparent substrate, and the light control sheet further comprises at least one of a first hard coat layer positioned on the polarizing layer on the opposite side with respect to the first transparent substrate and a second hard coat layer positioned on the second transparent substrate on an opposite side with respect to the second transparent electrode.

8. The light control sheet according to claim 2, further comprising:
a pair of transparent substrates sandwiching the pair of transparent electrodes,
wherein the pair of transparent substrates include a first transparent substrate and a second transparent substrate such that the first transparent substrate is positioned between the first orientation layer and the polarizing layer, the polarizing layer includes a polarizer and a pair of transparent films sandwiching the polarizer, the pair of transparent films include a first transparent film positioned on the polarizer on an opposite side with respect to the first transparent substrate and a second transparent film positioned between the polarizer and the first transparent substrate, and the second transparent film has a thickness smaller than a thickness of the first transparent film.

9. The light control sheet according to claim 2, further comprising:
a pair of transparent substrates sandwiching the pair of transparent electrodes,
wherein the pair of transparent substrates include a first transparent substrate and a second transparent substrate such that the first transparent substrate is positioned between the first orientation layer and the polarizing layer, and the polarizing layer includes a polarizer contacting the first transparent substrate and a transparent film positioned on the polarizer on an opposite side with respect to the first transparent substrate and contacting the polarizer.

10. The light control sheet according to claim 1, further comprising:
a pair of transparent substrates sandwiching the pair of transparent electrodes,
wherein the pair of transparent substrates include a first transparent substrate and a second transparent substrate such that the first transparent substrate is positioned between the first orientation layer and the polarizing layer, the polarizing layer includes a polarizer and a pair of transparent films sandwiching the polarizer, the pair of transparent films include a first transparent film positioned on the polarizer on an opposite side with respect to the first transparent substrate and a second transparent film positioned between the polarizer and the first transparent substrate, and the second transparent film has a thickness smaller than a thickness of the first transparent film.

11. The light control sheet according to claim 10, wherein the pair of transparent electrodes include a first transparent electrode sandwiched between the first orientation layer and the polarizing layer and a second transparent electrode positioned on the second orientation layer on an opposite side with respect to the light control layer, the pair of transparent substrates include the first transparent substrate and the second transparent substrate, and the light control sheet further comprises at least one of a first hard coat layer positioned on the polarizing layer on the opposite side with respect to the first transparent substrate and a second hard coat layer positioned on the second transparent substrate on an opposite side with respect to the second transparent electrode.

12. The light control sheet according to claim 1, further comprising:
a pair of transparent substrates sandwiching the pair of transparent electrodes,
wherein the pair of transparent substrates include a first transparent substrate and a second transparent substrate such that the first transparent substrate is positioned between the first orientation layer and the polarizing layer, and the polarizing layer includes a polarizer contacting the first transparent substrate and a transparent film positioned on the polarizer on an opposite side with respect to the first transparent substrate, and contacting the polarizer.

13. The light control sheet according to claim 12, wherein the pair of transparent electrodes include a first transparent electrode sandwiched between the first orientation layer and the polarizing layer and a second transparent electrode positioned on the second orientation layer on an opposite side with respect to the light control layer, the pair of transparent substrates include the first transparent substrate and the second transparent substrate, and the light control sheet further comprises at least one of a first hard coat layer positioned on the polarizing layer on the opposite side with respect to the first transparent substrate and a second hard coat layer positioned on the second transparent substrate on an opposite side with respect to the second transparent electrode.

14. A light control window, comprising:
a transmission section that transmits light;
a frame body surrounding the transmission section; and
the light control sheet of claim 1,
wherein the light control sheet is positioned in the transmission section.

15. The light control window according to claim 14, wherein the transmission section includes at least one plate member having optical transparency, the plate member includes an inner surface configured to be positioned to face inside of a vehicle passenger compartment and an outer surface configured to be positioned to face outside of the vehicle passenger compartment, and the light control sheet is positioned on the inner surface such that the polarizing layer is sandwiched between the plate member and the light control layer.

16. The light control window according to claim 15, wherein the polarizing layer has a thickness in a range of 25 μm to 120 μm.

17. The light control window according to claim 14, wherein the at least one plate member comprises two plate members having optical transparency, and the light control sheet is sandwiched between the two plate members.

18. The light control window according to claim 17, wherein the polarizing layer has a thickness in a range of 25 µm to 120 µm.

19. The light control sheet according to claim 1, wherein the light control layer is formed such that the liquid crystal composition is in a form of the plurality of domains having an average domain diameter in a range of 0.1 µm to 5 µm.

20. The light control sheet according to claim 1, wherein the light control layer is formed such that the liquid crystal composition is in a form of the plurality of domains having an average domain diameter in a range of 0.2 µm to 3 µm.

* * * * *